Patented Dec. 12, 1922.

1,438,840

UNITED STATES PATENT OFFICE.

JACOB G. LOCH AND CHARLES DI BATTISTA, OF BERWICK, PENNSYLVANIA.

PLASTIC COMPOSITION FOR FLUSH TANKS.

No Drawing. Application filed January 10, 1921. Serial No. 436,344.

*To all whom it may concern:*

Be it known that we, JACOB G. LOCH and CHARLES DI BATTISTA, citizens of the United States, and residents of Berwick, in the county of Columbia and State of Pennsylvania, have made certain new and useful Improvements in Plastic Composition for Flush Tanks, of which the following is a specification.

Our invention consists of new molded flush tanks and composition to be used in making them, and process of making the same.

Our tanks are made from a molded composition which may be molded immediately after being mixed before the composition is allowed to set or the composition may be allowed to harden after having been prepared and used at any time by heating it to make it plastic.

Our composition consists of sulphur, pumice stone, pulverized sand, magnesium carbonate, asbestos or other fibrous material, and a suitable coloring matter. In our composition the sulphur acts as a binder and the composition is made plastic by heating it.

While any of the filler materials may be omitted, if desired, it has been found that the inclusion of all the ingredients makes a much more efficient and useful article, particularly when used in about the following proportions:

Sulphur—50 to 80 parts,
Pumice stone—10 to 20 parts,
Pulverized sand—1 to 10 parts,
Magnesium carbonate—1 to 5 parts,
Asbestos or other fibrous material—1 to 3 parts, while the amount of coloring matter used will depend on the shade desired.

The various ingredients are mixed dry in the desired proportions and the mixture is then slowly heated until liquefied, and it may then be poured into molds of the desired shape or the mixture may be allowed to cool and harden and reheated when it is desired to use it, the first stated method, however, being that preferred.

Having fully described our invention, what we desire to secure by U. S. Letters Patent is:—

1. A molded flush tank consisting of a composition of matter which is water-proof, tough and stiff including sulphur, pumice stone, pulverized sand, magnesium carbonate, asbestos and coloring matter.

2. A molded flush tank consisting of sulphur 50 to 80 parts, pumice stone 10 to 20 parts, sand 1 to 10 parts, magnesium carbonate 1 to 5 parts, asbestos 1 to 3 parts and coloring matter to suit.

3. A water-proof, tough and stiff plastic composition for making flush tanks, consisting of sulphur, pumice stone, sand, magnesium carbonate, and fibrous material.

4. A plastic composition for making flush tanks, consisting of sulphur 50 to 80 parts, pumice stone 10 to 20 parts, pulverized sand 1 to 10 parts, magnesium carbonate 1 to 5 parts, fibrous material 1 to 3 parts, and coloring matter to suit.

JACOB G. LOCH.
CHARLES DI BATTISTA.